United States Patent Office 3,443,212
Patented May 6, 1969

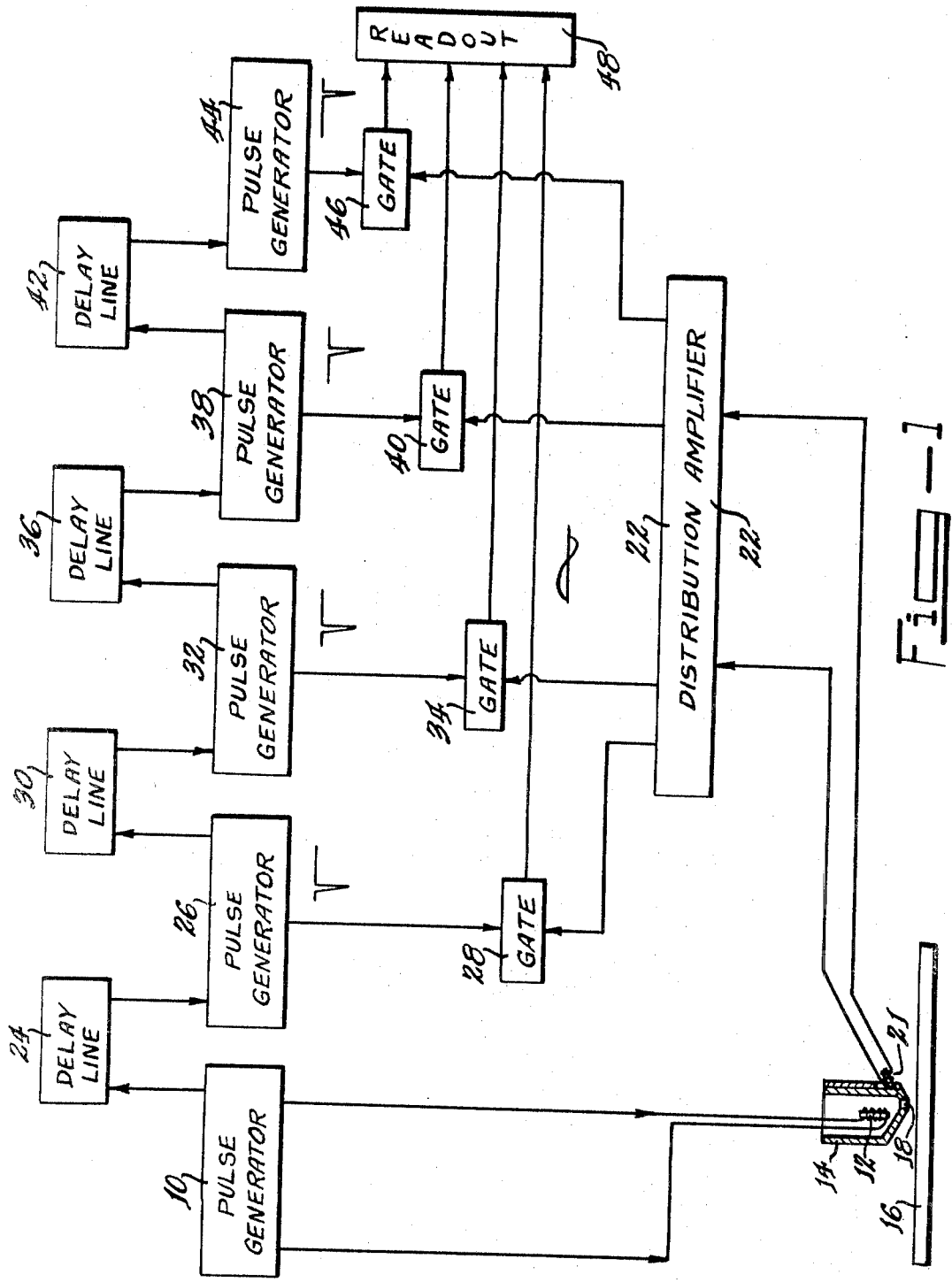

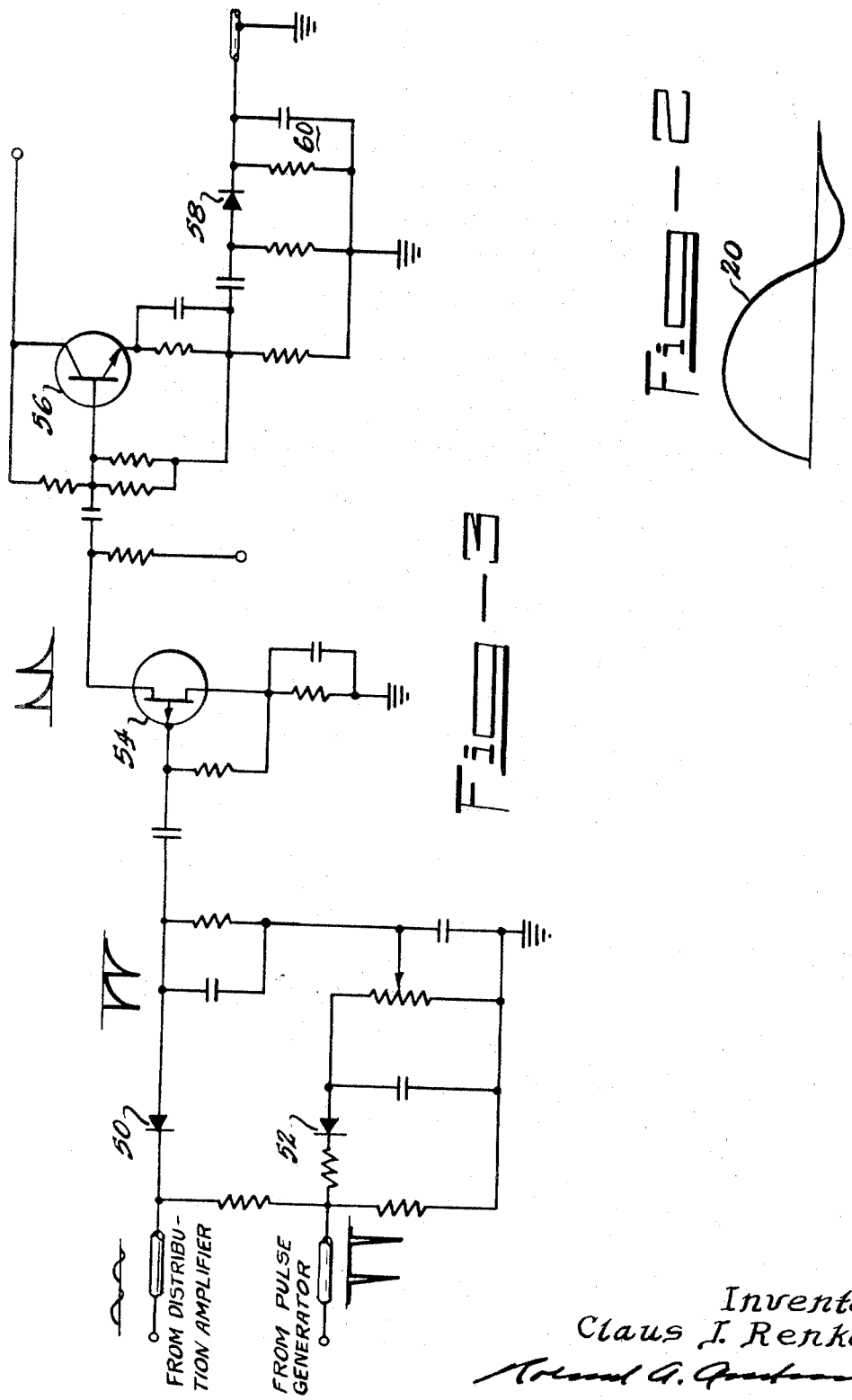

3,443,212
PULSED ELECTROMAGNETIC TESTING DEVICE WITH SAMPLING MEANS
Claus J. Renken, Orland Park, Ill., assignor to the United States of America as represented by the United States Atomic Energy Commission
Filed Dec. 20, 1967, Ser. No. 691,999
Int. Cl. G01r 33/14
U.S. Cl. 324—40                3 Claims

ABSTRACT OF THE DISCLOSURE

A multiparameter nondestructive electromagnetic testing device includes means for transmitting into a specimen a pulsed electromagnetic signal. Means are provided for sampling the amplitude of the reflected electromagnetic pulse from the specimen 2 $tw$ times at a time interval therebetween of $1/2w$, where $t=$the time duration of the reflected electromagnetic pulse and $w=$the band width of the reflected electromagnetic pulse detection means.

Contractual origin of the invention

Figure 4:
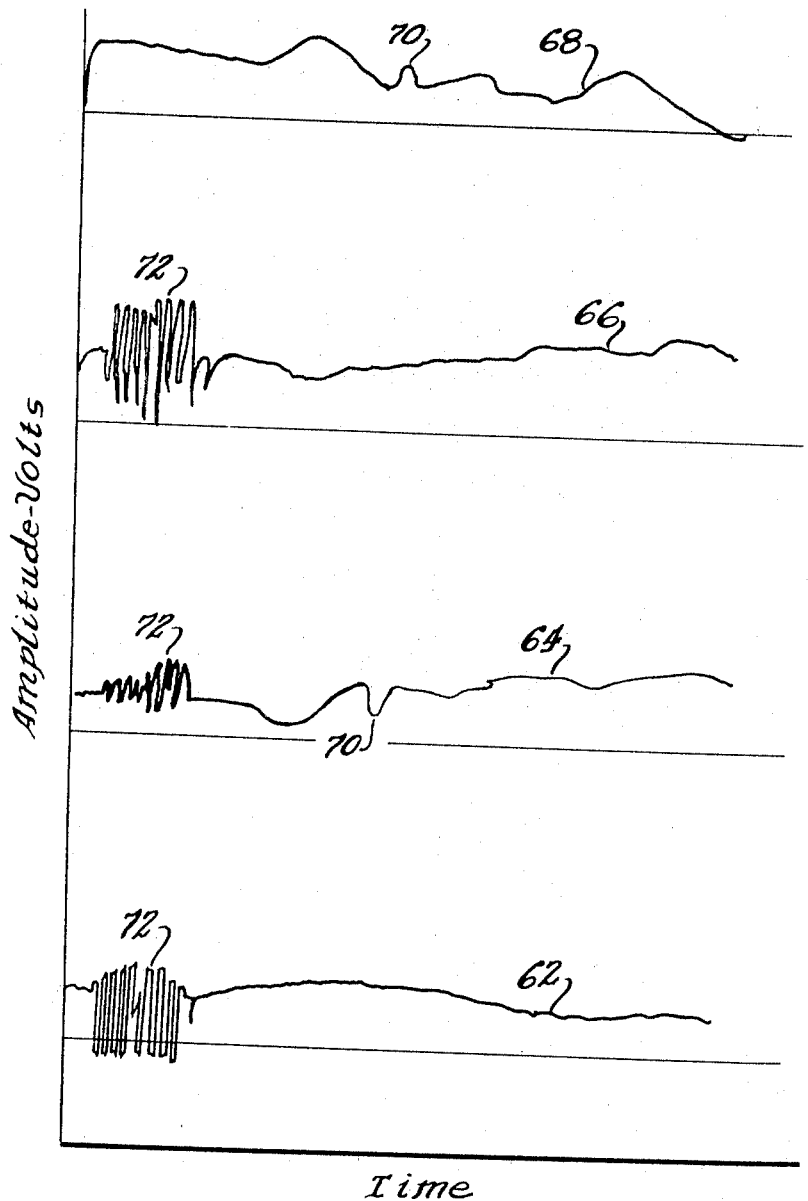

The invention described herein was made in the course of, or under, a contract with the United States Atomic Energy Commission.

Background of the invention

This invention relates to nondestructive electromagnetic testing devices and more particularly to pulsed nondestructive electromagnetic testing devices.

Conventional CW nondestructive eddy current testing devices use a single test frequency which gives two pieces of information about the test specimen. These two pieces of information may be expressed either in polar or rectangular form, from which it is possible to determine unambiguously the value of two test specimen variables or parameters. Typical specimen variables or parameters so measured are specimen resistivity, specimen thickness, probe-to-sample spacing, cladding thickness on the specimen and location, depth and the presence of subsurface flaws within the specimen. If one desires to determine simultaneously a third specimen variable, a single test frequency does not produce sufficient information to determine the third variable unambiguously. Further, even where additional variables are not of direct interest, their effects may mask those of the main variables, thereby reducing the effectiveness of the test. Thus, using a single frequency gives a limited amount of information which in some cases is sufficient but which generally leaves much of the test specimen information unrevealed.

Where a multifrequency signal is applied to the test specimen, more information is revealed about the specimen and enhances the nondestructive measurement capabilities with respect thereto. Such a system is described by Hugo L. Libby in U.S. Patent 3,229,198. In the system described in U.S. Patent 3,229,198, a multifrequency excitation signal is applied to a test specimen and the detected signal is analyzed into its Fourier components to measure the effects of specimen variables with respect to individual frequencies in the detected signal. Since each specimen variable affects each applied frequency differently, this technique permits enhanced nondestructive measurement of specimen variables. However, to expand and analyze the detected signal into its individual frequency components is both complex and difficult to accomplish.

Accordingly, it is one object of the present invention to provide an electromagnetic nondestructive testing device for measuring multiple parameters of a test specimen.

It is another object of the present invention to provide an improved electromagnetic nondestructive testing device.

It is another object of the present invention to provide a pulsed electromagnetic nondestructive testing device for enhanced measuring of specimen variables.

Other objects of the present invention will become more apparent as the general description proceeds.

In general, the present invention comprises means for generating an electromagnetic pulse and coupling said pulse to a test specimen. Means are provided for sampling the amplitude of the reflected electromagnetic pulse from the specimen 2 $tw$ times at a time interval therebetween of $1/2w$, where $t=$the time duration of the reflected electromagnetic pulse and $w=$the band width of the reflected electromagnetic pulse detection means.

In FIG. 1, a pulse generator 10 generates pulses at a predetermined repetition rate and pulse duration. These pulses are transmitted to a coil 12 housed in an attenuating mask 14 adjacent the specimen 16. A portion of the output from the transmitting coil 12, a series of pulsed electromagnetic fields, is transmitted through the aperture 18 of the mask 14 into the specimen 16 adjacent thereto. These pulsed electromagnetic fields penetrate the specimen 16, giving reflections therefrom as shown in FIG. 2. The theory of penetration and reflection of the pulsed electromagnetic fields within the specimen 16 is the same as that set forth by Renken in U.S. Patent 3,229,197. Thus, the waveform 20 shown in FIG. 2 is a typical waveform reflected from the specimen 16.

A receiving coil 21 mounted within the attenuating mask 14 detects the signals reflected from the specimen 16 and transmits them to a conventional distribution amplifier 22 which has a plurality of like outputs. When the pulse generator 10 transmits a pulse to the transmitting coil 12, it simultaneously transmits the pulse through a variable delay line 24 to a pulse generator 26. Pulse generator 26, responsive to the pulse output from pulse generator 10, generates a spike pulse which is extremely short in time duration relative to the duration of the pulse from pulse generator 10. The spike pulse output from generator 26 is fed to one input of a gate 28. The other input to the gate 28 is taken from one of the like outputs of distribution amplifier 22. The spike pulse output from pulse generator 26 is also fed via a variable delay line 30 to a pulse generator 32 which, responsive thereto, generates a spike pulse output identical to that generated by pulse generator 26 and transmits it to an input of a gate 34. The other input to the gate 34 is taken from one of the like outputs of distribution amplifier 22. The spike pulse output from pulse generator 32 is also fed through a variable delay line 36 to a pulse generator 38 which, responsive thereto, generates a spike pulse output identical to that generated by pulse generator 32 and transmits it to an input of a gate 40. The other input of gate 40 is taken from one of the like outputs of distribution amplifier 22. The spike pulse output from pulse generator 38 is also fed via variable delay line 42 to the input of a pulse generator 44 which, responsive thereto, generates a spike pulse output identical to that generated by pulse generator 38 and transmits it to an input of a gate 46. The other input to gate 46 is taken from a like output of distribution amplifier 22. The outputs of each of the gates 28, 34, 40 and 46 are fed to a readout device 48, such as a recording oscillograph.

Further understanding of the apparatus of FIG. 1 may be obtained by referring to FIG. 3 wherein is shown a schematic diagram of a gate used in FIG. 1. The gates 28, 34, 40 and 46 for the apparatus of FIG. 1 are identical and therefore a description of only one of the gates will be given. As stated, the two inputs to the gate are obtained from a pulse generator and a like output from the distribution amplifier 22. These inputs, as shown in FIG. 3, are added and then are rectified by a rectifier 50. The output from the rectifier 50 is, as shown, a signal having a saw-tooth waveform. A rectifier 52 and the resistive-capacitive network associated therewith compensates for variations in amplitude of the spike pulse output from the pulse generator. The output of the rectifier 50 is fed to the high-impedance input of a filed effect transistor 54. The output from field effect transistor 54, a signal still having a saw-tooth waveform, but opposite in polarity, is fed via an emitter follower amplifier 56 to a rectifier 58. Rectifier 58, together with the RC network 60, rectifies and filters the saw-tooth waveform output of the emitter follower 56 to provide a D-C output from the gate. Thus, the outputs from each of the gates 28, 34, 40 and 46 are each a demodulated slowly varying D-C signal which is fed to the recording readout device 48.

Transmitting and receiving coil arrangements other than the masked arrangement shown in FIG. 1 may be used for the practice of the present invention. The mask structure of FIG. 1 permits, as stated in U.S. Patent 3,229,197, the transmission of a sharply defined electromagnetic field, thereby giving high resolution measurements. For the practice of the present invention the transmitting and receiving coils may be unmasked as well as being of the encircling type.

The operation of the present invention is predicated upon the sampling theory in the time domain. If a function $G(t)$ contains no frequencies higher than $w$ cycles/sec., the function is completely determined by giving its ordinates at a series of points spaced $2w$ seconds apart, the series extending through the time domain. Thus, the entire information contained within the reflected pulse 20 from the specimen 16, as shown in FIG. 2, may be determined by sampling the reflected pulse a predetermined number of times. The maximum number of times that a pulse 20 has to be sampled to compeltely describe the information contained therein is $t(2w)$, where $w=$ the band width of the system in cycles per second and $t=$ the duration of the reflected pulse in seconds. Thus, each sampling is effected at a minimum time spacing therebetween of $1/2w$ seconds.

The typical reflected pulse 20 shown in FIG. 2 appears simultaneously on each of the outputs of the distribution amplifier 22, as previously described. The variable delay lines 24, 30, 36 and 42 are adjusted so that the spike pulse outputs for each of the generators 26, 32, 38 and 44 occur in time so they are spaced $1/2w$ seconds apart to permit their respective associated gates to sample the pulse 20 at their proper time interval. The outputs of each of the gates 28, 34, 40 and 46 are, as stated, a demodulated slowly varying D-C signal which is fed to the recording readout device 48. It is to be noted that the number of gates and associated pulse generators and delay lines is equal to the number of samples that should be effected for the reflected waveform 20 to obtain the information contained therein. The maximum number required to obtain the information in a reflected signal is $t(2w)$. The four described and illustrated sets of delay line, pulse generator and gate are for illustrative purposes only and are not intended to limit the present invention.

Further understanding of the present invention may be obtained by referring to the oscillograph display of FIG. 4. The four-channel oscillograph display of FIG. 4 was obtained using the apparatus of FIGS. 1 and 3 with a piece of stainless steel tubing having a .375" outside diameter and .335" internal diameter. The excitation pulse from pulse generator 10 had a width of .7 microsecond and a repetition rate of 1000 pulses per second. The effective band width of the receiving coil and distribution amplifier was approximately 3.3 megacycles. The return pulse from the test specimen was sampled at time intervals spaced from its time of generation of .15 microsecond, .3 microsecond, .42 microsecond and .8 microsecond. Waveform 62 represents the output of gate 28 and a sampling time of .15 microsecond. Waveform 64 represents the output of gate 34 and a sampling time of .42 microsecond. Waveform 66 represents the output of gate 40 and a sampling time of .43 microsecond. Waveform 68 represents the output of gate 46 and a sampling time of .8 microsecond. The stainless steel tubing had an inner surface notch .0625" long x .003" wide x .0045" deep. This notch is detected in waveforms 64 and 68 at a point 70 thereon. It is to be noted that the waveforms 62 and 66, representing the outputs of gates 28 and 40, do not show the notch and are insensitive thereto. To illustrate probe-to-specimen spacing variations, the specimen was vibrated for a short length of travel as it passed under the sending and receiving coils 12 and 30. The detected return signal therefor is shown at point 72 on waveforms 62, 64 and 66. Waveform 68 does not show any signal for the probe-to-specimen motion and is insensitive thereto. The amplitude variations of waveforms 64 and 68 result from changes in the thickness of the stainless steel tubing. Waveforms 62 and 66 are relatively insensitive to these variations.

It will be appreciated that the information contained in waveforms 62, 64, 66 and 68 may be combined in a number of ways to enhance the detection or suppression of specimen parameters. Such effects may be obtained by autocorrelation for each channel or cross correlation between channels. For example, the output waveforms 62, 64, 66 and 68 form a unique combination for any given parameter variation for the test specimen. Using a desirable reference specimen, the waveforms therefor are recorded and the waveforms obtained for subsequent specimens are compared thereagainst. This may be accomplished by converting the reference specimen waveform into digital words of an appropriate number of bits and storing the words in the memory of a computer. Waveforms of subsequent test specimens are also converted into digital words and compared in the computer against those of the reference specimen to provide nondestructive testing therefor. Further, if a condition in a test specimen is indicated by changes in signal level at two different sample points, the signal-to-noise ratio of the system may be enhanced by cross correlating the voltage levels at the two sample points. The two sample points can be chosen far enough apart in time to minimize noise coherence between noise at the two points.

It is to be remembered that, according to the present invention, the structure thereof embodies sampling of the reflected pulse at a maximum number of times equal to $t(2w)$ with a minimum time spacing between each time of $1/2w$. This does not preclude less than this number of samplings being taken at greater time intervals. The spectral power density content of the reflected pulse signal decreases towards zero frequency as time approaches infinity. Thus, where the test emphasis is on shallow penetration reflections (surface irregularities) from the specimen, maximum sampling usage will be effected at the beginning of the reflected pulse. Where the test emphasis is on deep penetration returns (subsurface irregularities), sampling emphasis is shifted to the trailing portion of the reflected pulse. For example, in the above example maximum sampling was effected at the front end of the reflected pulse (.15, .3, .42 microsecond) to detect probe-to-specimen motion. To detect the presence of the subsurface notch, sampling at only .8 microsecond was required. Thus, sampling at .6 microsecond was found not necessary for this specific example.

The embodiments of the invention in which an exclusive property or privilege is claimed are defined as follows:

1. An electromagnetic device for nondestructively testing a specimen comprising means for transmitting an electromagnetic pulse into said specimen, means for detecting the pulse of electromagnetic energy reflected from said specimen due to said transmitted pulse, and means for sampling a maximum of 2 $tw$ times the amplitude of said reflected electromagnetic pulse, where $t=$the time duration of the reflected electromagnetic pulse and $w=$the band width of said reflected-electromagnetic-pulse-detecting means.

2. The apparatus of claim 1 wherein said sampling means are effective to sample the amplitude of said reflected electromagnetic pulse a maximum of 2 $tw$ times at a minimum time interval therebetween of $1/2w$, where $t=$the time duration of the reflected electromagnetic pulse and $w=$the band width of said reflected-electromagnetic-pulse-detecting means.

3. The apparatus of claim 1 wherein said detecting and sampling means comprise a coil adapted to receive said pulse of reflected electromagnetic energy from said specimen, means coupled to said coil to produce a plurality of pulses, each like said received reflected electromagnetic pulse, means for generating a maximum of 2 $tw$ number of spike pulses, each referenced in time with respect to said reflected electromagnetic pulse and having a minimum time interval therebetween of $1/2w$, where $t=$the time duration of said reflected electromagnetic pulse and $w=$the band width of said receiving coil and pulse-producing means, means for combining each of said produced plurality of pulses and an associated one of said spike pulses to effect for each such combination a signal responsive to the amplitude of said reflected electromagnetic pulse at the time occurrence of the associated spike pulse, and means for recording each of said signals.

References Cited

UNITED STATES PATENTS

| | | | |
|---|---|---|---|
| 3,361,960 | 1/1968 | Renken et al. | 324—40 |
| 2,511,564 | 6/1950 | Callan | 324—34 |
| 3,229,197 | 1/1966 | Renken | 324—40 |
| 3,337,796 | 8/1967 | Hentschel et al. | 324—40 |

RUDOLPH V. ROLINEC, *Primary Examiner.*

ALFRED E. SMITH, *Assistant Examiner.*

U.S. Cl. X.R.

324—34